(No Model.)
J. BARRY.
LIQUID TEMPERATURE AND DENSITY TESTER.
No. 576,537. Patented Feb. 9, 1897.
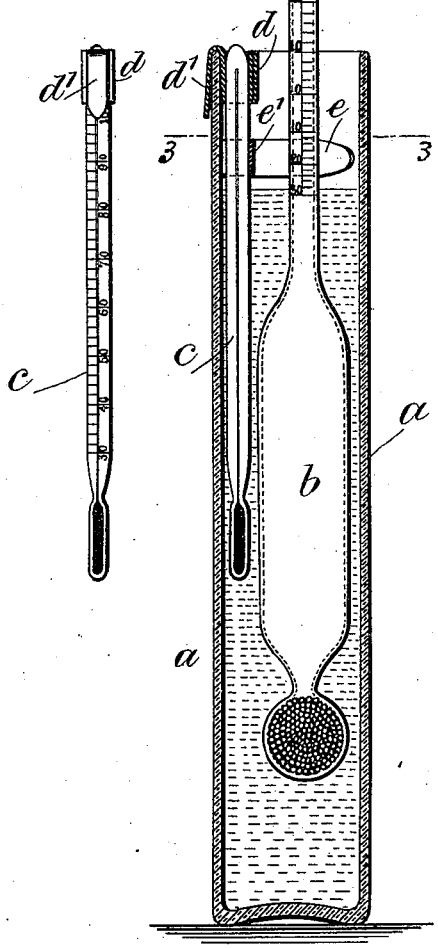

UNITED STATES PATENT OFFICE.

JOHN BARRY, OF NEW YORK, N. Y.

LIQUID TEMPERATURE AND DENSITY TESTER.

SPECIFICATION forming part of Letters Patent No. 576,537, dated February 9, 1897.

Application filed March 11, 1896. Serial No. 582,702. (No model.)

*To all whom it may concern:*

Be it known that I, JOHN BARRY, a citizen of the United States, residing at New York, in the county and State of New York, have invented a new and useful Improvement in Instruments for Testing the Temperature and Density of Liquids, of which the following is a specification.

Instruments for testing the temperature and density of liquids have heretofore been employed and have consisted of a liquid-holding vessel of upright form, a hydrometer adapted to float in the liquid to test its density, and a thermometer upon a plate of metal suspended from the liquid-holding vessel and adapted to indicate the temperature of the liquid.

My present invention relates particularly to the devices employed for suspending the thermometer from the liquid-holding vessel, so that the thermometer in the liquid maintains a position in close proximity to the liquid-holding vessel and where the same does not interfere with the free action of the hydrometer in testing the density.

In the drawings, Figure 1 is a vertical section of the vessel and elevation of the instruments. Fig. 2 is a plan of the same; Fig. 3, a sectional plan at line 3 3 of Fig. 1, and Fig. 4 an elevation of the thermometer and the devices connected therewith for suspending the thermometer in the vessel.

The liquid-holding vessel is represented at $a$ and the hydrometer at $b$. These are of usual and well-known construction and do not require further description. The thermometer is represented at $c$. This may be of any desired form, but I have shown and prefer the clinical thermometer. $d$ represents a spring-clip, and $d'$ a metal hook formed integral with the spring-clip. This spring-clip preferably embraces the upper end of the thermometer $c$, holding the same firmly, and the metal hook $d'$ extends over the upper edge of the liquid-holding vessel, suspending the thermometer therefrom, and I employ a spring-band $e$, having a half-eye $e'$ or depression at the center, which eye approximates the diameter of the thermometer-tube, the spring-band in circumference being a little less than the inner circumference of the liquid-holding vessel. This spring-band is sprung within the liquid-holding vessel and the stem of the thermometer is passed down within the eye $e'$ and the hook $d'$ over the upper edge of the vessel, the spring-clip and hook supporting the thermometer and the spring-clip $e$ steadying the thermometer and preventing any swinging movement thereof and at the same time holding the stem of the thermometer in close proximity to the inner surface of the liquid-holding vessel. The registry scale of the thermometer-stem is visible through the adjacent glass body of the liquid-holding vessel, so that the temperature can be easily read and the temperature and the density determined simultaneously.

I claim as my invention—

1. The combination with the liquid-holding vessel and the hydrometer, of the thermometer, the spring-clip $d$ and integral metal hook $d'$ for respectively engaging the upper end of the thermometer-stem and suspending the thermometer from the upper edge of the liquid-holding vessel and the spring-band within the liquid-holding vessel, and passing partially around the inner surface thereof and across behind the thermometer-stem for pressing and maintaining the same in close proximity to the inner surface of the liquid-holding vessel, substantially as set forth.

2. The combination with the liquid-holding vessel and the hydrometer, of the thermometer, the spring-clip $d$ and integral metal hook $d'$ for respectively engaging the upper end of the thermometer-stem and suspending the thermometer from the upper edge of the liquid-holding vessel, the spring-band $e$ having a half-eye $e'$, the spring-band being placed within the liquid-holding vessel and the eye passing over the thermometer-stem for maintaining the same in close proximity to the liquid-holding vessel, substantially as set forth.

Signed by me this 5th day of March, A. D. 1896.

JOHN BARRY.

Witnesses:
  GEO. T. PINCKNEY,
  HAROLD SERRELL.